Dec. 30, 1958
H. G. BUSIGNIES ET AL
2,866,899
ELECTRONIC SPECTROANALYSIS COMPUTER
Filed Dec. 12, 1955
3 Sheets-Sheet 1
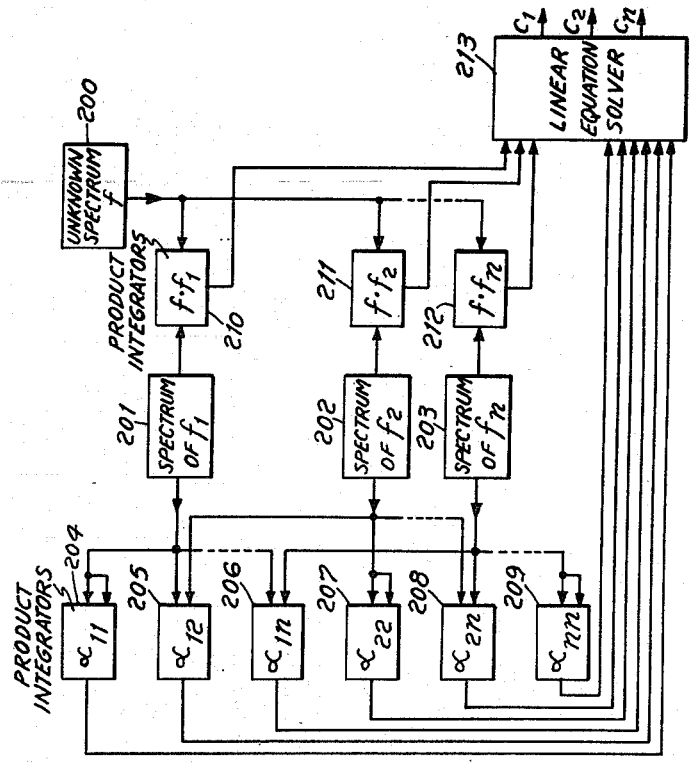
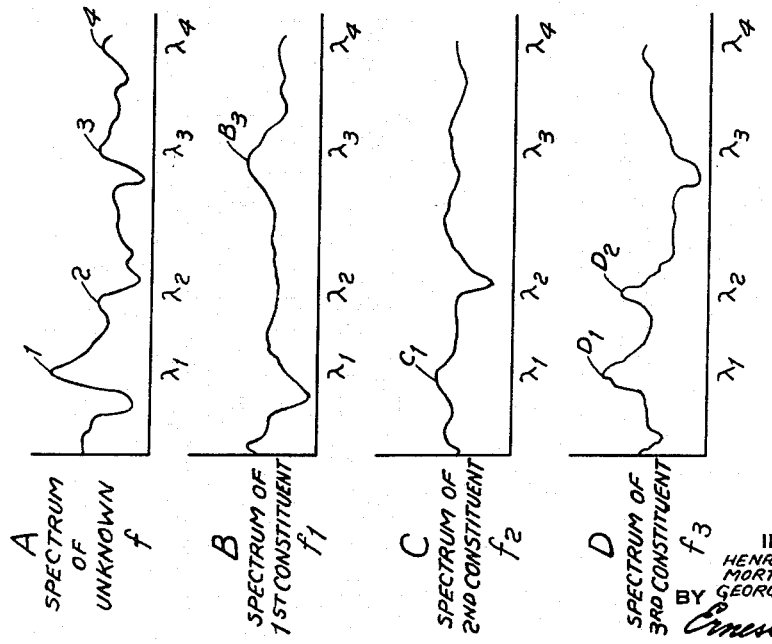
INVENTORS
HENRI G. BUSIGNIES
MORTIMER ROGOFF
GEORGES A. DESCHAMPS
BY
*Ernest Fannick*
ATTORNEY

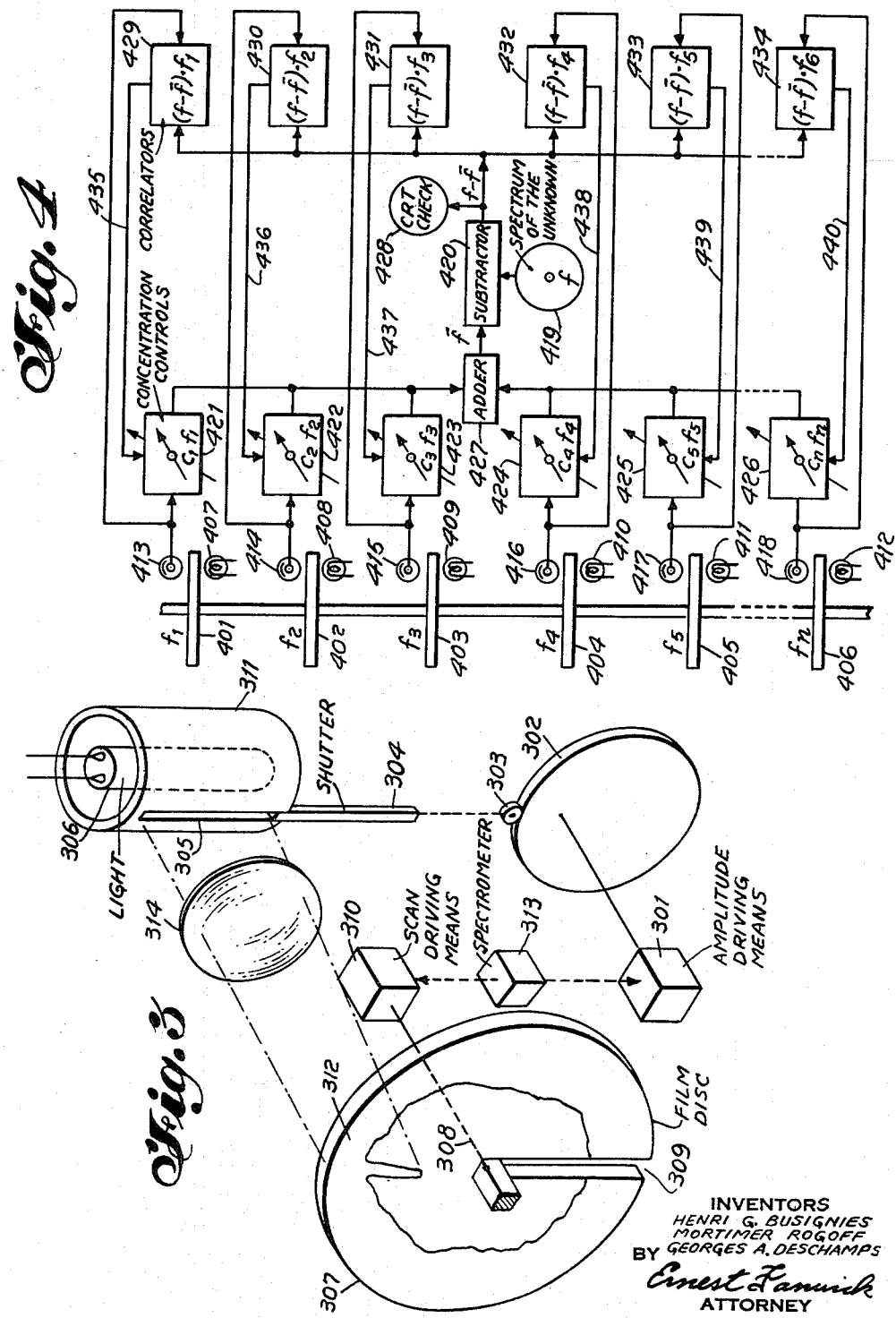

Dec. 30, 1958  H. G. BUSIGNIES ET AL  2,866,899
ELECTRONIC SPECTROANALYSIS COMPUTER
Filed Dec. 12, 1955  3 Sheets-Sheet 3
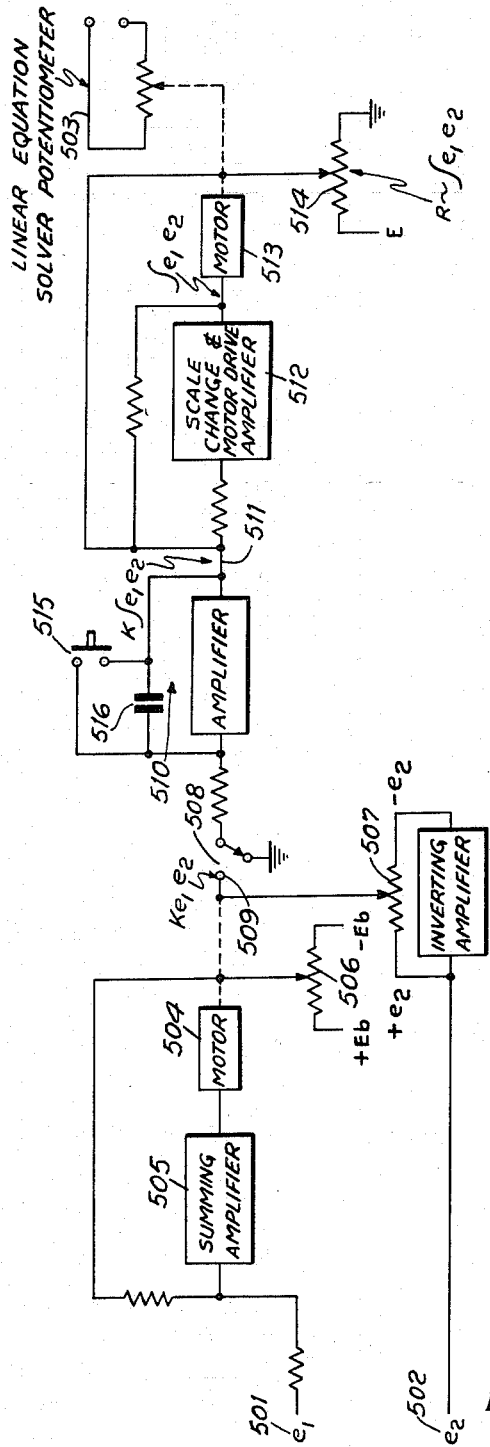
Inventors
HENRI G. BUSIGNIES
MORTIMER ROGOFF
GEORGES A. DESCHAMPS
By William E. Cleaver
Agent United States Patent Office 2,866,899
Patented Dec. 30, 1958

2,866,899

ELECTRONIC SPECTROANALYSIS COMPUTER

Henri G. Busignies, Montclair, and Mortimer Rogoff, Nutley, N. J., and Georges A. Deschamps, New York, N. Y., assignors to International Telephone and Telegraph Corporation, Nutley, N. J., a corporation of Maryland Application December 12, 1955, Serial No. 552,518

14 Claims. (Cl. 250—43.5)

The present invention relates to apparatus for the quantitative analysis of a spectrum and, more particularly, to apparatus which will automatically analyze the spectrum of a multicomponent sample and provide a quantative interpretation of the complex spectrum in terms of constituent spectra.

The absorbance spectrum of a substance is generally defined as the curve connecting the values representing the percentage of light absorbed by the substance with values representing the wavelength of the light absorbed and is a unique characteristic property of a substance. The absorbance spectrum is related to the logarithm of the inverse of the transmission characteristic of the substance, and the spectrogram of the transmission characteristic is often termed the absorption spectrum. Absorbance spectra can be used in the analysis of unknown mixtures by the plotting out of the complete spectrum and making measurements upon it or, more commonly, making more direct measurements of the light transmission characteristics on the absorption spectrum at a few selected wavelengths at which characteristic absorption occurs.

The well-known property of the infrared spectrum of a chemical compound is its "fingerprint" characteristic which relates the unique shape of the absorption or absorbance spectrum to the particular compound being analyzed. The ability to identify the chemical by its spectrum leads to the ability to perform qualitative and quantitative analyses of a chemical sample through the use of the infrared spectrum.

When several substances each having a complicated absorbance syectrum occur together in a mixture, the mixture spectrum is the summation of the individual absorbance spectra of the constituents. In the past, in the analysis of the absorbance spectrum of unknown mixtures containing a plurality of components by infrared spectroanalysis, the usual procedure was the measurement of the percentage absorption at a number of selected wavelengths, at least equal to the number of components in the mixture, and the solution of a similar number of simultaneous linear equations, in percentage absorption. Provided that extreme discretion was used in selecting the wavelengths at which measurements were made and that the interaction between components of the mixture was negligible and equations could be solved which yielded reasonably accurate results, then the concentrations of the separate components contained in the mixture could be determined. However, it will be readily understood that analysis by such a method was a long, tedious and cumbersome operation. Obviously, since spectra are the tools of the infrared analyst, in order to use this method of analysis effectively, it is essential that he be able to easily obtain the spectrograms and that he also be able to bring recognition and computation methods into his work so that he can complete his analysis.

Common to all of the infrared analysis techniques is the time required to produce infrared absorption spectra. In plotting spectra, a spectrometer usually scans a range of wavelengths and the energy of the spectra; or in some cases, the percentage transmission of the sample is recorded automatically on a chart. It is possible, by using detectors which respond very rapidly to radiation changes, to speed up the scanning until a suitable portion of a spectrum may be observe in an extremely short period. In present-day instruments, however, in order to produce a complete infrared absorption spectra, the period required may be as little as ten minutes or as much as a plurality of hours.

Today, the infrared spectrometers available are capable of producing adequate absorption spectra with accuracy, reproducibility and resolution sufficient to meet the needs of present-day analysis in a period of time which, for most purposes, is reasonable. It is the use of the information produced by the spectrometer that is time consuming and inaccurate. Thus, it is in the field of data storage, data handling, automatic computation, and increase in overall speed of solving the analytical problem that the greatest improvement in the use of spectroanalysis can be achieved.

It is readily apparent that, in analyzing chemicals by means of the interpretation of the infrared absorption spectra obtained therefrom, there is a place for automatic computation. To a certain extent, automatic computation has been achieved in the present equipment through methods of machine solution of sets of simultaneous linear equations used in the analysis. However, it is apparent that conventional methods of computation, even those including automatic solution of the linear equations, do not fully make use of all the information available in the spectra and, therefore, cannot be considered the most efficient methods.

Present analytical methods in the analysis of multicomponent mixtures utilize only selected values of absorption at discrete wavelength points in the spectrum. The quantitative analysis of this information is based on the fact that a solution of a set of simultaneous linear equations is possible when the number of sampling points of the spectra is at least equal to the number of constituents in the mixture. These sampling points are normally chosen to be those having the least overlap in the absorption peaks of the assumed individual constituents; and thus, the set of simultaneous equations that results is capable of providing the solution in terms of concentration of the constituents in the unknown composition with the least number of iterative steps in the arithmetic. A great deal of training is necessary in order to determine the preselection of the discrete wavelengths to be used in the analysis if the solutions are to be obtained quickly. In addition, as each new unknown is encountered by the analyst, the prior selection of discrete wavelengths must be performed over again with consideration given to the absorption peaks of the new unknown. Thus, it may be summarized that present analytical methods require three steps: the first comprising an assumption of the identity of the unknowns; the second the selection of discrete wavelengths related to absorption peaks as shown by the spectrum of the unknown for the analysis; and the third the determination of the values of absorption at these wavelengths for the constituent compounds.

One of the objects of this invention, therefore, is to provide apparatus to automatically quantitatively analyze a given spectrum through an analytical procedure which utilizes the entire spectrum rather than selected analytical wavelengths and thus, by eliminating the preselection of wavelengths, makes full use of all the information available in the given spectra.

Another object of this invention is to provide absorption spectroanalysis computing equipment which will increase the speed and simplify the process of the spectroanalysis.

Still another object of this invention is to provide an automatic computer which will quickly provide a quantitative analysis of an unknown compound by machine calculations.

One of the important features of our invention is the technique of interpreting the unknown spectrum by combining and adjusting a set of reference spectra so that an electrically synthesized mixture is obtained which is substantially a perfect match of the unknown spectrum.

The infrared spectroanalysis computer of our invention utilizes a plurality of spectra as reference material and is capable of providing rapid identification of the unknown compound to be analyzed. Once the qualitative analysis is completed, the spectra of the selected list of constituents are analyzed; and the desired quantitative analysis is automatically calculated to provide the quantitative results of the constituents contained in the unknown compound. The unknown compound consisting of a mixture of constituents is examined and compared with a synthetic compound made up of the stored spectra of reference chemicals to yield positive identifying data related to the unknown being examined.

Another feature of this invention is in an apparatus for the quantitative analysis of the spectrum of an unknown composition. There is provided first a first signal having a waveshape representative of the spectrum of the composition to be analyzed and a plurality of second signals each having a waveshape representative of at least one of the constituents of the composition. The product integrals of the first signal multiplied by each of the second signals are obtained and the product integrals of each of the second signals multiplied by each of the second signals including each second signal multiplied by itself are also obtained. A definite integral formed by multiplying the first signals with the second signals and integrating over the wavelengths of interest is also obtained. From these product integrals a set of simultaneous equations can be set up in which the only unknowns are coefficients representing the concentration of the constituent components in the given composition. These simultaneous linear equations are solved in known computer mechanisms to yield the quantities of the constituents present in the composition.

Another feature of this invention for the quantitative analysis of the unknown spectrum provides for either an arbitrary assumption or a calculated assumption of the concentration coefficients. There is provided apparatus to individually adjust the amplitudes which represent coefficient quantities of the second set of signals referred to in the last-mentioned feature which are then added together to form a synthesized spectrum which is subtracted from the spectrum of the unknown composition to form an error signal. The error signal is multiplied by each of the second signals and integrated over a period of time to generate a plurality of correction signals which are fed back to the quantity adjusting means to correct the concentration values of the amplitudes of the constituent spectra making up the synthesized spectrum.

The above-mentioned and other features and objects of this invention will become more apparent by reference to the following description taken in conjunction with the accompanying drawings, in which:

Fig. 1 is a graphic illustration of a set of curves showing in curve A the absorbance spectrum of a given composition formed from the summation of the absorbance spectra of the constituents shown in curves B, C and D;

Fig. 2 is a schematic diagram is block form of one embodiment of apparatus for the quantitative analysis of a spectrum;

Fig. 3 is a schematic drawing of one embodiment of apparatus utilized in recording spectra;

Fig. 4 is a schematic diagram in block form of an alternate embodiment of apparatus for the quantitative analysis of the spectrum of a given composition; and Fig. 5 is a schematic-block diagram of the product integrator components coupled to the linear equation solver input potentiometer.

Prior to describing the automatic electronic spectroanalysis equipment of this invention which provides various forms of qualitative and quantitative analysis, the limitation of any automatic computation of the infrared analysis should be described. The use of infrared in identifying chemical compounds is simple when one is analyzing a single one or a few unknowns at any one time. As the number of unknown constituents in a mixture is increased, chemical interactions take place within the mixture which tend to distort the linear combination of spectrum and the respective concentrations of the plurality of unknowns exist over a wider set of values. Various instrumental errors begin to mask the contribution of the individual known elements to the mixture spectrum and, in addition, with a large number of unknowns being present, it is difficult to perform the necessary qualitative analysis which must precede the quantitative solution. Thus, it is clear that the computer of this invention is capable of handling mixtures in which there is a limit to the number of unknown constituents and beyond which other computing means must be utilized to determine the constituents. The solution of qualitative and quantitative analytical problems can be solved by machine methods rapidly and accurately with a lower overall expenditure of time than by any other method. The computer of this invention can analyze mixture spectra up to the point where accuracy of determination of the unknown constituents is comparable to the degrading effects of the instrumental errors and nonlinear combination of the individual known spectra. Beyond this point, other techniques must be employed to allow for the accurate determination of the spectrum.

Referring to Fig. 1 of the drawings, a typical infrared absorbance spectrum of an unknown compound is shown in curve A. It, of course, must be recognized that the usual infrared spectrometer yields a value which is a measure of the transmission of the infrared energy through the sample cell, and this must be converted to the absorbance of the sample cell. Absorbance is equal to the logarithm of the inverse of the transmission, and thus it is possible to obtain the absorbance spectrum for the unknown compound shown in curve A. It should be noted that the typical absorbance spectrum shown in curve A has a plurality of characteristic peaks 1, 2, 3 and 4 at selected wavelengths $\lambda_1$, $\lambda_2$, $\lambda_3$ and $\lambda_4$. Curves B, C and D of Fig. 1 are a series of absorbance spectra derived from samples of constituents contained in the unknown composition having a spectrum shown in curve A. It should be noted that the spectrum of curve B has a characteristic amplitude peak $B_3$ at wavelength $\lambda_3$. The values of absorbance of the samples shown in curves C and D at wavelength $\lambda_1$ must be added to the value shown by curve B to obtain the amplitude of the mixture spectrum of curve A at wavelengths $\lambda_1$. It must be remembered that merely the ratios of the amplitudes of curves B, C and D are critical rather than the absolute values of the amplitude. Identical procedures should be carried forth to obtain the amplitude values of absorbance at other wavelengths in the spectrum range. It should be noted, however, that the characteristic peaks resulting from the summation of the individual spectrum of the constituents at a predetermined frequency may be shifted due to a non-linear combination of the elemental constituents.

A simple concept of quantitative analysis is a procedure in which the unknown spectrum $(f)$ is compared with a synthesized spectrum $(f)$ which is made up of one or more known spectra $(f_i)$. Since the absorbance spectra is unique, there is only one combination of selected reference spectra which, when taken in the proper relative amounts, will form a synthetic spectrum which is the replica of the unknown. This method is used today in one form or another as the basis of all quantitative analysis and may be represented as $$f = \sum_{i=1}^{i=n} c_i f_i \qquad (1)$$

where $f$ = spectrum of the unknown composition
$f_i$ = spectra of constituent portions of the unknown compositions and
$c_i$ = quantity or relative concentration of an individual constituent present in the unknown.

In most instances, the absorbance spectrum of an assumed component is represented by one or more values of absorbance at stated wavelengths. The spectra of these reference or constituent samples are combined in the proper ratio so that the composite set of samples matches the sum of absorbance at selected wavelength values in the unknown spectrogram or, in other words, when this match has been made then this equation is true, $$\bar{f} = \sum_{i=1}^{i=n} c_i f_i \qquad (2)$$

where $\bar{f}$ = spectrum synthesized by combining known spectra $f_i$ in relative concentrations $c_i$.

The method of obtaining the relative concentrations $c_i$ of these selected constituents is the solution of a set of simultaneous linear equations provided that the proper analytical wavelengths are selected. Our invention contemplates a quantitative analysis in which the entire absorbance spectrum is utilized instead of samples selected at particular wavelengths. Obviously, utilizing the entire spectrum eliminates the meticulous task of selecting optimum sampling point, and the analysis merely becomes the creation of a synthetic mixture spectrogram which is matched against the unknown. Instead of creating a simultaneous set of samples which match the absorbance values at corresponding wavelengths in the unknown, an entire mixture spectrum $(\bar{f})$ is created which can then be matched against the entire spectrum of the unknown $(f)$.

The use of an entire absorbance spectrum is similar to the infinite expansion of the number of samples used to describe the absorbance spectrum of the compound, thus gaining greater accuracy in the determination and with use of automatic calculating devices eliminating any sacrifice in time loss.

Since a synthesized spectrum waveform $(\bar{f})$ is created which is compared with the waveform of the unknown $(f)$, criteria are necessary to determine the quality or accuracy of the fit between the two spectrograms. One general method used in waveform matching is the least-squared error criterion for quality. If an exact match is made between these waveforms at every point of their extent, then the difference between these two waves is zero valued at all points. If, however, there is a difference in form or amount existing between the two waveforms, there will be a best combination of constituents of one of these waveforms that will provide the best match in terms of stated criteria. The mathematical statement of the least-squared error is one such criterion which, by its use in comparing two waveforms, tends to minimize large discrepancies between the two waves at the expense of creating small residual differences distributed throughout the interval of the fit. It is a kind of smoothing process which appears well suited to the needs of the spectrum matching.

To summarize the above discussion, if a synthesized spectrum $(\bar{f})$ is composed of a plurality of spectra $(f_i)$ each modified by a concentration coefficient $(c_i)$, the synthesized spectrum may be defined as:

$$\bar{f} = \sum_{i=1}^{i=n} c_i f_i \qquad (2)$$

The difference between the synthesized spectrum and the spectrum of the unknown may be termed the error function:

$$\text{Error function} = f - \bar{f} = f - \sum_{i=1}^{i=n} c_i f_i \qquad (3)$$

According to the method of least squares stated above for the best match requires that the integral of the square of the error $$\int_{\lambda_1}^{\lambda_2} \left( f - \sum_{i=1}^{i=n} c_i f_i \right)^2 d\lambda \qquad (4)$$

over the range of interest $\lambda_1$ $\lambda_2$ be minimized. To minimize a function set the first derivative with respect to the variable parameters, the concentration coefficients $c_k$, equal to zero:

$$\frac{\partial}{\partial c_k} \int_{\lambda_1}^{\lambda_2} \left( f - \sum_{i=1}^{i=n} c_i f_i \right)^2 d\lambda = 0 \qquad (5)$$

$$= \int_{\lambda_1}^{\lambda_2} 2 \left( f - \sum_{i=1}^{i=n} c_i f_i \right) \frac{\partial}{\partial c_k} \left( f - \sum_{i=1}^{i=n} c_i f_i \right) d\lambda \qquad (6)$$

$$\frac{\partial f}{\partial c_k} = 0 \qquad (7)$$

$$= 2 \int_{\lambda_1}^{\lambda_2} \left( f - \sum_{i=1}^{i=n} c_i f_i \right) \left[ - \sum_{i=1}^{i=n} \frac{\partial}{\partial c_k} (c_i f_i) \right] d\lambda \qquad (8)$$

but if $c_k$ is the $k^{\text{th}}$ concentration coefficient, then $$\frac{\partial}{\partial c_k} (c_i f_i) = f_k \qquad (9)$$

Thus, for the square of the error to be minimized:

$$\int_{\lambda_1}^{\lambda_2} \left( f - \sum_{i=1}^{i=n} c_i f_i \right) f_k d\lambda = 0$$

In view to the discussion below define the notation for a scalar product of two functions of $\lambda$ ($\lambda$ = wavelength), $g$ and $h$:

$$g \cdot h = \int_{\lambda_1}^{\lambda_2} g(\lambda) h(\lambda) d\lambda \qquad (9a)$$

Thus as seen from the above discussion, when the formulation of the total squared errors is stated, the contribution of each constituent to the total error is described. These contributions are measured by the values of the partial derivatives of the error function with respect to each of the constituent waveforms. In the process of computation, the relative amounts of each constituent are varied until these derivatives are set to be zero. When this set of zero-valued derivatives is obtained, the combination of reference spectra is the best fit to the unknown spectrum. The independent variables in this case are the coefficients of concentration of the individual compounds. When the best fit is obtained, the answer is read out in terms of concentration coefficients which provide the match.

The form of the partial derivatives of these error functions is similar to the well-known cross-correlation coefficients. When the equations are expanded so as to describe the linear combinations of functions which create the mixture spectrum, it is seen that the least-squared error criterion can be stated in terms of a set of correlation coefficients which are the integrated products of pairs of functions $(f_i \cdot f_k)$; where $$f_i \cdot f_k = \int_{\lambda_1}^{\lambda_2} f_i(\lambda) \cdot f_k(\lambda) d\lambda$$

the integral being taken over the wavelength interval of interest $\lambda_1$ to $\lambda_2$.

In other words, if Equation 9a, is expanded, a set of simultaneous linear equations is obtained as follows:

$$\left(f - \sum_{i=1}^{i=n} c_i f_i\right) \cdot f_k = 0 \quad (9b)$$

$$f \cdot f_k - \sum_{i=1}^{i=n} c_i f_i \cdot f_k = 0 \quad (9c)$$

Let $$f \cdot f_k = x_k \quad (10)$$

and let $$f_i \cdot f_k = \alpha_{ik} \quad (11)$$

then:

$$x_k = \sum_{i=1}^{i=n} c_i \alpha_{ik} \quad (12)$$

or $$x_1 = c_1 \alpha_{11} + c_2 \alpha_{12} + c_3 \alpha_{13} \quad (12a)$$
$$x_2 = c_1 \alpha_{21} + c_2 \alpha_{22} + c_3 \alpha_{23} \quad (12b)$$
$$x_3 = c_1 \alpha_{31} + c_2 \alpha_{32} + c_3 \alpha_{33} \quad (12c)$$

Thus, the linear combination of these "correlation coefficients"

$$\int_{\lambda_1}^{\lambda_2} f_i f_k d\lambda$$

is adjusted by coefficient ($c_i$) to match a similar set of "correlation coefficients" ($x_i = f \cdot f_i$) obtained from the product of unknown spectrum ($f$) multiplied by each of the constituent spectra ($f_i$) integrated over the range of interest. The use of the entire spectrum allows the least-squared error to exist as a weighted mean over the entire wavelength interval and, therefore, tends to smooth the result, averaging out small errors that may arise in many portions of the combined spectra.

One process of machine calculation in accordance with the principles of this invention comprises the use of a library of spectra of constituent elements ($f_i$) contained in the unknown composition spectrum ($f$) and the proper combination of these spectra ($f_i$) to create a set of simultaneous linear equations consisting of a set of integrated products of the paired constituent spectra ($\alpha_{ik}$) and the product integrals of the unknown composition spectrum function paired with each of the constituent spectra ($f \cdot f_k$).

Referring to Fig. 2 of the drawings, one embodiment of an apparatus suitable for use in the quantitative analysis of the unknown spectrum is therein shown to comprise a source 200 of the unknown spectrum function ($f$).

The apparatus of this invention is dependent upon obtaining a recording of the spectrogram of the individual constituents of the unknown composition as well as a recording of the spectrogram of the unknown in a form which can be easily used to generate a signal representative of these functions.

Referring to Fig. 3, one embodiment of an apparatus suitable for the recording of spectra in an easily reproducible form is therein shown. The spectrometer 313 which can be of the type referred to in the Journal of the Optical Society, volume 40, 1950, contains a source of radiation which covers the wavelength interval of interest and irradiates a sample cell containing the composition. The emergent radiant energy falls on a detector. Assuming that the source is uniform over the wavelength interval, then the sample cell modifies the emergent radiation by a replica of its own absorption spectrum. The emergent beam is filtered and passes only a particular frequency, and this filtered energy falls upon a detector having a uniform response over the wavelength interval, such as a thermocouple. The temperature rise and voltage output of the detector are proportional to the percent transmission of radiation by the cell at the filtered frequency. The spectroanalytical equipment 313 detects the transparency of an individual constituent mixture or compound and causes the amplitude of the output of the spectroanalytical equipment to vary in amplitude in accordance with the percent transmission characteristic as the frequency band is scanned. The transmission characteristics of individual spectra cannot be linearly added since mixture spectrograms are linearly additive in terms of absorbance rather than transmission. It is thus necessary to convert the transmission characteristic into an absorption characteristic, which can be linearly added, as described by Beer's law. The absorbance function is equal to the log of the inverse of the transmission function.

In order to convert transmission to absorbance, the amplitude of the output signal of the spectroanalytical device is coupled to an amplitude-driving equipment 301 whose output drives a cam 302. The follower 303 associated with cam 302 moves in a reciprocating vertical motion responsive to the output of motor 301 modified by the characteristic of the cam 302. The follower 303 drives a shutter 304 mounted in the slit 305 of a cylinder which is illuminated by a light 306. It is apparent from the drawing that, when the output of the spectroanalytical device 313 is at a maximum and the shutter 304 does not close the slit 305 allowing a maximum amount of light from source 306 to be transmitted out of the slit and focused by optics 314 onto a light-sensitized disc 307 which is mounted on a shaft 308 by means of a keying slot 309. As the spectroanalytical device 313 starts to scan the wavelength of interest, the light-sensitive disc 307 is driven by scan driving means 310 to start its rotation from one side of the keying slot 309. The developed disc 307 will have varying areas 312 which are opaque to light since the drum 311 has slit 305 whose area was varied by moving the shutter 304 relative to the amount of output of the analytical device at a particular wavelength. The outline of areas 312 represents the absorbance characteristic of a given cell or a known constituent, as the case may be.

Alternately, many other forms of recording of spectrum information can be utilized. For example, since the spectrum of the unknown composition need not be permanently stored, the output of the spectroanalytical device can be coupled to the recording input associated with a magnetic drum recording unit whose output head could then read a signal having a waveshape substantially identical to the waveshape of the recorded unknown spectrum. Obviously, still other methods of recording information could be utilized; and the above means are merely illustrative and in no way limit the apparatus of this invention.

Referring again to Fig. 2, if the information is recorded in a magnetic form, the devices 201 through 203 can be any well-known magnetic reading heads or obviously any device to read a voltage signal waveform which is representative of a spectrum. Each of the reference waveforms from sources 201—203, which can be reproduced by a photocell reader equipment described in connection with Fig. 4, is multiplied by all of the reference spectra waveforms generated from the same sources in separate multiplier units 204—209 to obtain the values $\alpha_{11}, \alpha_{12}, \ldots$ described in Equations 12a, b, and c. The devices 204 through 212 as well as the devices 429 through 434 of Fig. 4 can be product integrators such as those described in the Technical Report No. 136 of the Research Laboratory of Electronics, entitled "A High Speed Product Integrator," published by the MIT, August 17, 1949. The product integration could be also performed by using a multiplier device such the one described on pages 215 and 216 and the integrating device, coupled thereto, as described on page 11 of the text "Electronic Analog Computer" by Korn and Korn, published in 1952, by McGraw-Hill. From each of the product integrators there is obtained a single voltage output which represents a product integration. These voltage values are transmitted to an equation solver capable of solving simultaneous linear equations.

Simultaneously with the obtaining of these products, the unknown spectrum ($f$) from source 200 is multiplied in multiplying equipment 210—212 by each of the reference spectra from sources 201—203.

Returning again to the mathematical analysis described above, it is evident that the unknown function ($f$) multiplied by a given one of the reference spectra ($f_1$) is equal to the summation of the products of each of the reference spectra ($f_1$) times the given one of the reference spectra ($f_1$) modified by a coefficient $c_i$. There are N numbers of equations, the linear Equations 12a, b, and c set forth above, which can be solved at the present time by any one of many available means, including hand methods, with sophisticated mathematical short cuts, where the number of unknowns is relatively small. When the number of unknowns exceeds approximately five or six, recourse can be made to existing high-speed calculators which are capable of being programed to solve sets of simultaneous linear equations.

The solution of the set of simultaneous linear Equations 12a, b, and c is accomplished in computer 213 which can be a device of the type described in volume 19 of the "Journal of Applied Physics," April 1948 on page 339. The solution will provide the concentration coefficients $c_i$ which are proportional to the quantity present in the given composition having a spectrum function ($f$) of the constituents represented by the spectra ($f_i$) associated with the coefficients ($c_i$). Another device which can perform this solution of simultaneous linear equations is described on pages 264 through 272 of volume 17 of the "Journal of Applied Physics," April 1946.

Referring to Fig. 4 of the drawings, another embodiment of apparatus to perform the quantitative analysis of a spectrum obtained from an unknown composition is shown. The design of the apparatus shown in Fig. 4 is based upon Equation 3. The apparatus of Fig. 4 requires, as does the apparatus of Fig. 2, a plurality of sources of spectra, constituents contained in the unknown; and these spectra may be considered as a part of a library of reference spectra. Each of these sources includes a recording of the spectrum of a single constituent, whether it be elemental, compound or mixture in nature, which might be found in the unknown composition. Each of these recorded spectra is to be considered a standard in that they represent the spectrum of a constituent compound having a known concentration in a standard analytical cell. Obviously, the number of these library functions can be extended indefinitely.

The library spectra are each recorded on a photographic disc 401—406, as previously described in connection with Fig. 3. The transformation of these photographically recorded library spectra into an electrical waveform having an identical function is easily performed by providing a source of light 407—412 by each of the photographic discs 401—406. A photoelectric cell 413—418 detects the light transmitted by the photographic discs and converts the light energy into an electrical waveform having an identical function. Thus, the library spectra waveforms $f_1$ to $f_n$ are produced. The spectrum ($f$) of the unknown sample is recorded on a magnetic drum 419 or on other storage means and introduced into the computer of this invention as one input to the difference or subtractor circuit 420. The "adder" used in connection with the invention can be any well-known resistance network and the "subtractor" can be any well-known transformer which gives phase inversions. This unknown spectrum ($f$), in general, will be a mixture of the absorption spectra of a plurality of constituents although, in a simple case, it may consist of the spectrum of only a single unknown compound.

Each of the functions $f_1$ to $f_n$ generated from the recorded library spectra is passed through its own associated concentration control 421—426 which function as attenuators of the repetitive electrical signal generated from the associated library spectrum. The concentration controls can be equation setting potentiometers such as those described on page 118 of the text by Korn and Korn, published in 1952, described above. Thus, at the output of each of the concentration controls 421—426, there exists a replica of the library functions $f_1$ to $f_n$ or a replica of the spectrum of one of the assumed constituents of one of the unknown mixtures $f$ which is modified in amplitude only by a coefficient $c_1$ to $c_n$. The set of amplitude-modified library functions ($c_i f_i$) is coupled from the output of the concentration controls 421—426 and added together in the summation circuit 427 to form a synthetic spectrum ($\bar{f}$) or, in other words, the assumed spectrum of the unknown function ($f$). This synthetic spectrum ($\bar{f}$) or assumed mixture is defined as a composition containing the constituents represented by spectra $f_1$ to $f_n$ in the quantities represented by $c_1$ to $c_n$ respectively. The synthetic spectrum ($\bar{f}$) is coupled as the second input to the subtractor circuit 420 whose output then represents a difference spectrum ($f-\bar{f}$) equal to the difference between the unknown spectrum and the synthesized spectrum. If a perfect match is obtained, i. e., the assumed constituents added together, in the concentrations represented by the setting on controls 421—426, is equal to the unknown composition, then the difference spectrum will be zero for all values of time or wavelength of the spectrogram. Obviously, a perfect match is obtained when the adder receives all the constituent elements from the library spectra of the unknown modified in proper proportion by the coefficient controls.

If the input signals to the adder 427 contain more constituents than are present in the unknown, the coefficients for those additional constituents would, of course, be zero and the output from the respective correlators would cause the respective coefficient controls to be driven to zero, thus not substantially affecting the results of the computation. The difference spectrum output from subtractor circuit 420 is displayed on a cathode-ray tube oscilloscope 428; and thus, the operator, by observing this display, can quickly check the quality of the match between the unknown and synthetic spectra.

At the start of a computation, the difference spectrum will seldom be a zero-valued function; and the remaining apparatus of this embodiment of the invention is utilized to reduce the error function represented by the difference spectrum to a zero value. Assuming that the library of recorded spectra contains all the elements of the unknown, then the only determination which the computer must make is the error coefficients attributable to each of the coefficient controls 421—426 when fed back to modify the controls 421—426 causing them to modify the amplitudes of the constituted spectra $f_1$ to $f_n$. In order to generate these error coefficients, the difference spectrum output of subtractor 420 is coupled to a separate product integrator or correlator 429—434 associated with each of the library functions. The difference spectrum ($f-\bar{f}$) is correlated with the individual constituents spectrum functions to create the instantaneous product of the two inputs to the correlator. These products are accumulated in the integrator over a desired value of integration time and operate a mechanical or electrical coupling 435—440 to adjust the concentration controls 421—426 in such a manner as to reduce the error signal to a zero value. These mechanical couplings can be any of the well-known servo systems. When the concentration controls are no longer receiving signals to be adjusted, the values of the potentiometer settings or $C_1$ through $C_n$ of Fig. 4 will be the proper concentration coefficient of the library functions that are contained in the unknown.

The equipment shown in Fig. 4 can be utilized in another manner if the number of constituents contained in the unknown is relatively small and the feedback features can be eliminated. If the concentration controls 421, 422 . . . are manipulated in such a manner that all possible ratios of amplitude of the input reference spectra are produced, at some point during this manipulation the difference spectrum will be zero valued; and the cathode-ray tube will show a straight-line curve on the zero axis. When this event occurs, the setting of the concentration controls indicate the proper ratio.

Obviously, the equipment shown in Fig. 4 requires an initial setting to be placed upon the concentration controls 421—426 in order to zero value the difference spectrum. If the equipment shown in Fig. 2 is used as the initial equipment to determine the necessary initial concentration coefficients or control settings which can be set into the concentration controls 421—426, there can be a check circuit between the equipment of Fig. 2 and Fig. 4.

In Fig. 5 the inputs $e_1$ $e_2$ show respectively at 501 and 502 represent a pair of input signals to any one of the product integrators 204 through 212 of Fig. 2. The linear equation solver potentiometer 503 represents a potentiometer of the equation solver 213 of Fig. 2, which can be set to provide an input signal to the equation solver. The voltage $e_1$ applied to the motor 504 through the summing amplifier 505 drives the potentiometer 506 to a point representative of $e_1$. The motor 504 simultaneously drives the potentiometer 507 to a physical position similar to that of potentiometer 506. Since the terminals of 507 are the limits of $-e_2$ to $+e_2$ then the output at the tap of potentiometer 507 is a voltage $Ke_1e_2$, which is proportional to $e_1$ multiplied by $e_2$. With switch 508 connected to the terminal 509 the signal $Ke_1e_2$ is passed to the integrator circuit 510, the output of which becomes $K\int e_1e_2$ as shown at 511. The signal $K\int e_1e_2$ is passed to the amplifier 512 to effect a scale change and thereby transmit a signal $\int e_1e_2$ to drive the motor 513. The motor 513 drives the two potentiometers 503 and 514. The potentiometer 514 effects a null to stop the motor drive and the resultant setting of the potentiometer 503 represents the setting for $\int e_1e_2$ to be made in the linear simultaneous equation solver. The switch 513 is closed to discharge the condenser 516 and ground the integrator circuit to return the potentiometer to a zero setting between readings.

While we have described above the principles of our invention in connection with specific apparatus, it is to be clearly understood that this description is made only by way of example and not as a limitation to the scope of our invention as set forth in the objects thereof and in the acocmpanying claims.

We claim:

1. Apparatus for determining the respective quantities of a plurality of reference spectra in a given spectrum comprising a signal source having a waveshape representative of said given spectrum, a plurality of sources of reference signals each having a waveshape respectively representative of one of said rereference spectra, means for performing a mathematical operation on said reference signals to provide at least one combination signal, means for producing a signal at least in part responsive to said given spectrum signal, means for comparing said combination signals and said produced signal, and means responsive to said comparison for determining the respective quantities of said reference signals in said given spectrum signal.

2. Apparatus for the quantitative analysis of the spectrum of a given composition comprising a signal source having a waveshape representative of the spectrum of said given composition, a plurality of sources of component signals each having a waveshape respectively representative of one of a plurality of spectra each representing at least one of the components of said given composition, means for individually adjusting the respective quantities of said plurality of signals, means for combining said plurality of adjusted signals, and means for comparing the output of said combining means with said signal representative of the spectrum of said given composition.

3. Apparatus for the quantitative analysis of the spectrum of a given composition comprising a first signal source having a waveshape representative of the spectrum of said given composition, a plurality of sources of second signals each having a waveshape respectively representative of at least one of the components of said given composition, means for obtaining the scalar products of said first signals and each of said second signals, means for obtaining the scalar products of each of said second signals, multiplied by each of said second signals, and means to establish a plurality of simultaneous equations in which each equation is representative of said first signal multiplied by a given one of said second signals to yield a scalar product which is equal to the sum of the scalar products of each of said second signals multiplied by said given one of said second signals when each of said last-identified scalar products is modified by a particular coefficient representing the concentration of its associated one of said components in said given composition.

4. Apparatus for the quantitative analysis of the spectrum of a given composition comprising a first signal source having a waveshape representative of the spectrum of said given composition, a plurality of sources of second signals each having a waveshape respectively representative of at least one of the components of said given composition, means for individually adjusting the respective quantities of said plurality of second signals, means for combining said plurality of adjusted second signals, means for subtracting the output of said combining means from said first signals, a plurality of means for correlating the output of said subtraction means with each of said plurality of second signals to generate a plurality of error signals each associated with one of said second signals, and means for coupling each of the error signals associated with one of said second signals to the adjusting means associated with the one of said second signals.

5. Apparatus for the quantitative analysis of the spectrum of a given composition comprising a first signal source having a waveshape representative of the spectrum of said given composition, a plurality of sources of second signals each having a waveshape respectively representative of at least one of the components of said given composition, means for obtaining the scalar products of said first signals and each of said second signals, means for obtaining the scalar products of each of said second signals multiplied by each of said second signals, means to establish a plurality of simultaneous equations in which each equation is representative of said first signal multiplied by a given one of said second signals to yield a scalar product which is equal to the sum of the scalar products of each of said second signals multiplied by said given one of said second signals when each of said last-identified products is modified by a particular coefficient representing the concentration of its associated one of said components in said given composition, means for individually adjusting the respective quantities of said plurality of second signals, means for adjusting said quantity adjusting means responsive to said concentration coefficients, means for combining said plurality of adjusted signals, and means for comparing the output of said combining means with said signals representative of the spectrum of said given composition.

6. Apparatus for the quantitative analysis of the spectrum of a given composition comprising a signal source having a waveshape representative of the spectrum of said given composition, a plurality of sources of component signals each having a waveshape representative of one of a plurality of spectra each representing at least one of the components of said given composition, means for individually adjusting the respective quantities of said plurality of signals, means for combining said plurality of adjusted signals, means for obtaining a difference signal representative of the difference between said given composition signal and said combined signal, means for obtaining the product integrals of said difference signal and each of said component signals, means for generating an error signal for each of said adjusting means responsive to one of said product integrals, and means coupling said error signals to said adjusting means to vary said respective quantities of said component signals.

7. Apparatus for the quantitative analysis of the spectrum of a given composition comprising a signal source having a waveshape representative of the spectrum of said given composition, a plurality of sources of component signals each having a waveshape representative of one of a plurality of spectra each representing at least one of the components of said given composition, means for individually adjusting the respective quantities of said plurality of signals, means for combining said plurality of adjusted signals, means for obtaining a difference signal representative of the difference between said given composition signal and said combined signal, and means for varying said respective quantities of said component signals to minimize the square of said difference signal.

8. Apparatus for the quantitative analysis of the spectrum of a given composition comprising a signal source having a waveshape representative of the spectrum of said given composition, a plurality of sources of component signals each having a waveshape representative of one of a plurality of spectra each representing at least one of the components of said given composition, means for individually adjusting the respective quantities of said plurality of signals, means for combining said plurality of adjusted signals, means for obtaining a difference signal representative of the difference between said given composition signal and said combined signal, and means for determining the contribution of each of said component signals in said difference signal including means for determining the value of the partial derivative of the difference signal with respect to each of the component signals.

9. Apparatus for determining the degree of match between a first waveform of a given shape and a second waveform composed of a plurality of constituent wave shapes comprising means for subtracting the instantaneous amplitude of said first waveform from the instantaneous amplitude of said second waveform to obtain a third waveform and means for obtaining the integrated products of the instantaneous amplitude of each of said plurality of constituent waveshapes and said third waveform to determine the degree of match.

10. A system for synthesizing a given waveform from a plurality of constituent waveshapes comprising means to obtain the scalar product of said waveform and each of said waveshapes, means to obtain the scalar product of each of said waveshapes multiplied by each of said waveshapes, means to obtain a plurality of simultaneous equations wherein the scalar product of said waveform times a given one of said waveshapes is equal to the sum of the scalar products of said given one of said waveshapes multiplied by each of said waveshapes modified by an associated coefficient, means to solve said plurality of linear equations to determine said coefficients, and means for adding each of said given waveshapes in the ratio indicated by said coefficients to synthesize said waveform.

11. Apparatus for determining the respective quantities of each of a plurality of reference waves contained in a given composite wave, comprising a source of said given composite wave, a plurality of sources of said reference waves, means to combine said reference waves in a selected mathematical relationship to provide a combination wave, means for comparing said combination wave and said given composite wave, and means responsive to said comparison for determining the respective quantities of each said reference waves in a said given composite wave.

12. Apparatus for the quantitative analysis of the spectrum of a given composition comprising a signal source having a waveshape representative of the spectrum of said given composition, a plurality of sources of component signals each having a waveshape representative of one of a plurality of spectra each representing at least one of the components of said given composition, means for individually adjusting the respective quantities of each of said plurality of signals, means for combining said plurality of adjusted signals, and means for comparing the output of said combining means with said signal representative of the spectrum of said given composition and means responsive to the output of said comparing means for adjusting the respective quantities of said component signals in the formation of a new combination signal.

13. Apparatus for determining the respective quantities of a plurality of reference spectra in a given spectrum comprising a signal source for producing a given signal having a waveshape representative of said given spectrum, a plurality of sources of reference signals each having a waveshape respectively representative of one of said reference spectra, means for comparing said given signal and said reference signals, and means responsive to said comparison for determining the respective quantities of said reference signals in said given spectrum signal.

14. Apparatus for determining in connection with a given composite wave the specific contributions to the makeup of said given wave attributable to each of a plurality of reference waves contained therein comprising a source of said given composite wave, a plurality of sources of said reference waves, means to combine said reference waves in a selected mathematical relationship to provide a combination wave, means for comparing said combination wave and said given composite wave, and means responsive to said comparison for determining the specific contributions of each of said reference waves to said given composite wave makeup.

No references cited.